United States Patent
Ryoo et al.

(10) Patent No.: US 10,314,080 B2
(45) Date of Patent: Jun. 4, 2019

(54) RANDOM ACCESS TECHNIQUE IN MOBILE COMMUNICATION SYSTEM USING BEAMFORMING

(71) Applicants: Samsung Electronics Co., Ltd., Gyeonggi-do (KR); Korea Advanced Institute of Science and Technology, Daejeon (KR)

(72) Inventors: Sun-Heui Ryoo, Yongin-si (KR); Sung-Jin Park, Icheon-si (KR); Nam-I Kim, Daegu (KR); Dong-Ho Cho, Seoul (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 15/531,392

(22) PCT Filed: Nov. 24, 2015

(86) PCT No.: PCT/KR2015/012658
§ 371 (c)(1),
(2) Date: May 26, 2017

(87) PCT Pub. No.: WO2016/085235
PCT Pub. Date: Jun. 2, 2016

(65) Prior Publication Data
US 2017/0318608 A1 Nov. 2, 2017

(30) Foreign Application Priority Data
Nov. 26, 2014 (KR) .......... 10-2014-0166583

(51) Int. Cl.
*H04W 74/08* (2009.01)
*H04W 16/28* (2009.01)
*H04W 84/04* (2009.01)

(52) U.S. Cl.
CPC ........ *H04W 74/0833* (2013.01); *H04W 16/28* (2013.01); *H04W 84/042* (2013.01)

(58) Field of Classification Search
CPC combination set(s) only.
See application file for complete search history.

(56) References Cited

U.S. PATENT DOCUMENTS

| 2005/0053029 A1 | 3/2005 | Lee et al. |
| 2011/0019694 A1 | 1/2011 | Kwon et al. |

(Continued)

FOREIGN PATENT DOCUMENTS

| KR | 1020050024085 A | 3/2005 |
| KR | 20130011993 A | 1/2013 |

(Continued)

OTHER PUBLICATIONS

International Search Report dated Feb. 23, 2016 in connection with International Patent Application No. PCT/KR2015/012658.

(Continued)

*Primary Examiner* — Thai Nguyen (57) ABSTRACT

The present disclosure relates to a 5G or pre-5G communication system that will be provided to support higher data transfer rate following a 4G communication system such as LTE. The present disclosure relates to a method of performing random access of a terminal, said method comprising: an operation of determining the number of received beams of a base station connected to transmitted beams of the terminal; an operation of determining an area of wireless transfer resource on the basis of the number of the received beams; and an operation of transmitting random access message in (Continued)

the random access resource defined by the beam resource corresponding to the determined number and the wireless transfer resource corresponding to the determined area.

18 Claims, 7 Drawing Sheets

(56) References Cited

U.S. PATENT DOCUMENTS

| | | | |
|---|---|---|---|
| 2013/0021979 A1 | 1/2013 | Kwon et al. | |
| 2015/0195015 A1 | 7/2015 | Kim et al. | |
| 2015/0208443 A1 | 7/2015 | Jung et al. | |
| 2016/0099763 A1* | 4/2016 | Chen | H04B 7/0695 370/329 |
| 2016/0157267 A1* | 6/2016 | Frenne | H04B 7/086 370/329 |
| 2016/0295614 A1* | 10/2016 | Lee | H04W 48/08 |

FOREIGN PATENT DOCUMENTS

| | | |
|---|---|---|
| KR | 20140004513 A | 1/2014 |
| WO | 2009/116819 A2 | 9/2009 |
| WO | 2014/014315 A1 | 1/2014 |
| WO | 2014/027868 A1 | 2/2014 |
| WO | 2014/139174 A1 | 9/2014 |

OTHER PUBLICATIONS

Written Opinion of the International Search Authority dated Feb. 23, 2016 in connection with International Patent Application No. PCT/KR2015/012658.

* cited by examiner

RANDOM ACCESS TECHNIQUE IN MOBILE COMMUNICATION SYSTEM USING BEAMFORMING

CROSS-REFERENCE TO RELATED APPLICATIONS

This application is a National Phase Entry of PCT International Application No. PCT/KR2015/012658, which was filed on Nov. 24, 2015, and claims a priority to Korean Patent Application No. 10-2014-0166583, which was filed on Nov. 26, 2014, the contents of which are incorporated herein by reference.

TECHNICAL FIELD

The present disclosure relates to a random access (RA) performance scheme of a terminal in a mobile communication system and a random access scheme of a terminal using beamforming.

BACKGROUND

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

One of the subjects of research on next generation communication after 4G communication is to increase a system communication capacity by increasing an available frequency band. As a frequency band to be added to increase the frequency band, a method of using a carrier of a band from 3 to 30 GHz (millimeter eave band), that is, a millimeter wave carrier is considered rather than using a carrier of a frequency band below 3 GHz used in a commercial cellular system.

The millimeter wave (mmWave) carrier of the band from 3 to 30 GHz may have directivity due to propagation characteristics, and a beamforming technique may be used for controlling interference when the carrier is operated. In the millimeter wave band, not only a Base Station (BS) but also a User Equipment (UE) may generate beams having a particular angle and width through multiple array antennas to perform communication. That is, the BS and the UE may use transmission/reception beamforming to solve a path attenuation problem occurring in the millimeter wave carrier. The BS and the UE may operate a plurality of transmission/reception beamformings, and may use the plurality of transmission/reception beamformings in random access (RA) resources.

When the UE performs random access through one random transmission beam in a state where the BS forms a plurality of reception beams, the transmission beam of the UE may have links with one or more reception beams of the BS. For example, the UE may have links with a plurality of reception beams of the BS according to whether the reception beams of the BS correspond to LOS (Line Of Sight) or NLOS (Non-Line Of Sight). At this time, the UE having a link with one reception beam of the BS may be hindered in its random access by another UE having links with two or more reception beams of the BS.

Figure 1A:
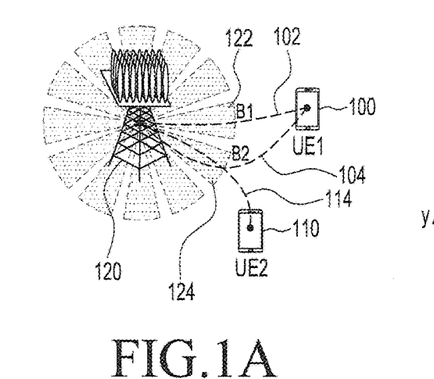
FIG. 1A and FIG. 1B illustrate a concept of a random access method in a mobile communication system using a millimeter wave band.
Figure 1B:
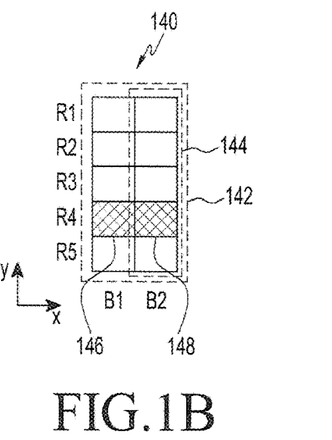

FIG. 1A and FIG. 1B illustrate a concept of a random access operation of a UE in a mobile communication system.

FIG. 1A illustrates a situation where UEs are connected to a plurality of different reception beams and perform uplink random access.

A BS 120 may form a plurality of reception beams (for example, including B#1 122 and B#2 124). UE#1 100 may have links 102 and 104 with at least one of the reception beams B#1 122 and B#2 124 by using one or more transmission beams, and UE#2 110 may have a link 114 with reception beams B#2 124 by using one or more transmission beams.

FIG. 1B illustrates an RA resource set 140 that can be used by UE#1 100 and UE#2 110.

The RA resource set 140 has an RA resource structure defined by beam resources (x axis) and frequency-time resources (y axis). That is, the x axis of the RA resource set 140 corresponds to an axis of the reception beam of the BS and the y axis corresponds to an axis of frequency-time resources. For simplification, two-dimensional radio resources defined by the frequency and time are represented on the y axis in one dimension.

UE#1 100 has the links with reception beam B#1 122 and B#2 124 and thus has 10 resources in a resource area 142 by reception beam B#1 122 and B#2 124 as RA resources. In contrast, UE#2 110 has the link with reception beam B#2 124 and thus has 5 resources in a resource area 144 by reception beam B#2 124 as RA resources. At this time, UE#1 100 may select frequency-time resources R#4 146 and 148 for B#1 122 and B#2 124, and UE#2 110 and perform random access, and UE#2 110 may select only frequency-time resources R#4 146 for B#2 124 and perform random access.

When UE#1 100 and UE#2 110 simultaneously perform random access by using the frequency-time resources R#4 146 of reception beam B#2 (that is, collision occurs), UE#2 110 has no other available RA resources and thus fails in random access. However, UE#1 100 can use other available RA resources, that frequency-time resources R#4 144 of B#1 and thus has an RA success possibility.

That is, a UE having a larger number of reception beams connected thereto holds a dominant position in an RA competition. Further, a UE having a smaller number of reception beams connected thereto is at a disadvantageous position in the RA competition.

In a communication system using a millimeter wave carrier, one BS may possess a large number of RA resources (that is, transmission/reception beams) from an angle of spatial resources. That is, in the millimeter wave carrier communication system, there are a plurality of reception beams and a plurality of UEs attempt RA for the plurality of reception beams.

SUMMARY

Aspects of the present disclosure are to address at least the above-mentioned problems and/or disadvantages and to provide at least the advantages described below. Accordingly, since RA attempts of a plurality of UEs in a millimeter wave carrier communication system may increase a possibility of RA collision and interrupt access of other UEs, a transmission/reception beam operating method to reduce RA collision is required.

An aspect of present disclosure provides a method of mitigating a problem of collision with other UEs.

Another aspect of the present disclosure provides an RA method based on the number of reception beam links with the BS in the mobile communication system using the millimeter wave.

In accordance with an aspect of the present disclosure, there is provided a method of performing random access of a UE. The method includes: determining a number of reception beams of a BS connected to transmission beams of the UE; determining areas of radio transmission resources based on the number of reception beams; and transmitting random access message in random access resources defined by beam resources corresponding to the determined number and radio transmission resources corresponding to the determined areas.

The present disclosure proposes a UE for performing random access. The UE includes: a controller configured to determine a number of reception beams of a BS connected to transmission beams of the UE, determine areas of radio transmission resources based on the number of reception beams; and a transceiver configured to transmit random access message in random access resources defined by beam resources corresponding to the determined number and radio transmission resources corresponding to the determined areas.

The present disclosure proposes a method of supporting random access. The method includes: determining a number of reception beams of a BS connected to transmission beams of a UE; determining areas of radio transmission resources based on the number of reception beams; and receiving a random access message in random access resources defined by beam resources corresponding to the determined number and radio transmission resources corresponding to the determined areas.

The present disclosure proposes a BS supporting random access of a UE. The BS includes: a controller configured to determine a number of reception beams connected to transmission beams of a UE and determine areas of radio transmission resources based on the number of reception beams; and a transceiver configured to receive a random access message in random access resources defined by beam resources corresponding to the determined number and radio transmission resources corresponding to the determined areas.

According to the random access method of the present disclosure, it is possible to effectively prevent collision between UEs based on the number of BS beam links connected to each UE beam in an environment where a plurality of BS beams and a plurality of UE beams exist.

The random access method of the present disclosure can increase a random access success possibility by preventing collision between UEs having the different numbers of links.

The random access method of the present disclosure can provide differential RA success rates to UEs having different priorities.

The random access method of the present disclosure can provide an RA supporting method to a service requiring access to a plurality of BS reception beams.

Through the RA method according to the present disclosure, an RA collision program that may be newly generated by the introduction of a VCN (virtual cellular network) system can be solved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A base station is a subject communicating with a User Equipment (UE), and may be referred to as a BS, a Node B (NB), an eNode B (eNB), an Access Point (AP) or the like.

The user equipment is a subject communicating with the BS, and may be referred to as a UE, a Mobile Station (MS), a Mobile Equipment (ME), a device, a terminal or the like.

Beam resources refer to one or more beams formed in a BS or a UE, and each beam may perform its own transmission/reception operation through radio transmission resources.

Radio transmission resources is a term collectively indicating resources used for radio transmission by the BS or the UE and construed as radio transmission resources except for beam resources in the present disclosure. Specifically, the radio transmission resources may be resources defined by at least one of a frequency, a time, and a code. For example, the radio transmission resources may be frequency resources, time resources, frequency-time resources, or resources defined by frequency-time-code. Here, the code may be an orthogonal code such as a Walsh code. Hereinafter, the radio transmission resources will be represented by frequency-time resources for convenience but it should be noted that the radio transmission resources may be construed as the above described other examples.

The present disclosure proposes a random access scheme of the UE having links with a plurality of reception beams of one BS in a millimeter wave band communication environment. The random access scheme according to the present disclosure may include at least one of three steps.

A first step corresponds to a step for grasping a number of reception beams of the BS connected to radio transmission resources and the UE. A second step corresponds to a step for selecting RA resources (for example, frequency-time resources) according to the number of reception beam links and performing RA based on a competition. A third step corresponds to a step for an RA response (success or failure) of the BS to an RA attempt of the UE.

The first step of the random access scheme according to the present disclosure is described with reference to FIG. 2A and FIG. 2B.

Before performing random access, the UE should identify reception beams of the BS to be connected thereto. Hereinafter, the reception beam of the BS connected to the UE is referred to as a "reception beam link".

The present disclosure proposes two methods by which the UE identifies the number of reception beam links.

Figure 2A:
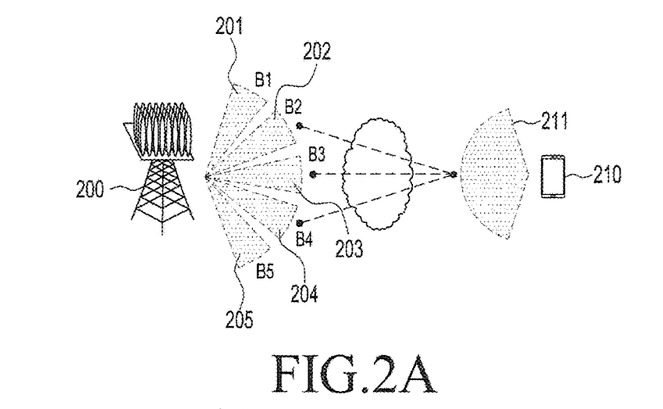
FIG. 2A and FIG. 2B illustrate a method by which a UE determines reception beam links according to an embodiment of the present disclosure.
Figure 2B:
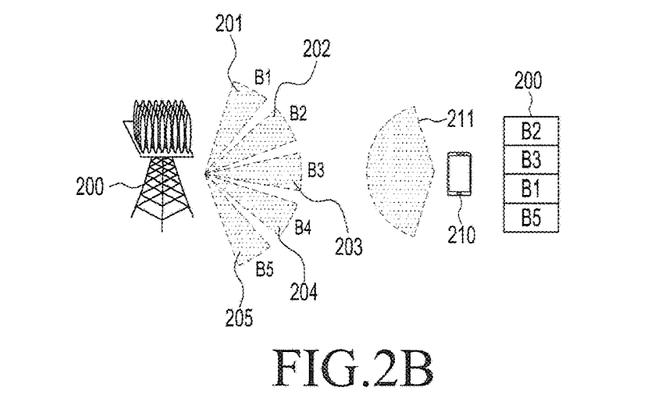

FIG. 2A and FIG. 2B illustrates an example of a method by which the UE determines reception beam links according to an embodiment of the present disclosure.

A BS 200 forms, for example, five reception beams 201, 202, 203, 204, and 205, and a UE 210 forms one transmission beam 211.

FIG. 2A illustrates a case where the UE determines reception beams links based on a downlink channel estimation value.

In a first method by which the UE 210 determines reception beam links, the UE determines reception beam links based on a downlink beam channel estimation result. The UE may perform a downlink beam channel estimation through a beam pilot signal transmitted through the reception beams of the BS, determine beams (for example, 202, 203, and 204) having a channel estimation result value (for example, received signal strength (RSS)) higher than a predetermined threshold value as the reception beam links, and identify the number of reception beam links.

FIG. 2B illustrates a case where the UE determines reception beam links based on a neighbor advertisement.

In a second method by which the UE 210 identifies beam links, the UE 210 uses a neighbor advertisement 220 transmitted from the BS 200. The UE may receive the neighbor advertisement 220 and determine reception beam links based on information such as a beam identifier of the BS existing in the neighbor advertisement. Specifically, after performing beam scanning, the UE may determine one or more of the reception beams corresponding to indexes (for example, reception beam indexes 2, 3, 1, and 5) within an active set existing in the neighbor advertisement as the reception beams links and identify the number of reception beam links. It has been described, as an example, that the number of transmission beams 211 is one in FIG. 2A and FIG. 2B. However, when the UE uses a plurality of beams, reception beam links of the BS may be defined for the plurality of beams and the UE may identify the number of reception beam links.

The second step of the random access scheme according to the present disclosure is described with reference to FIGS. 3 to 6.

Figure 3:
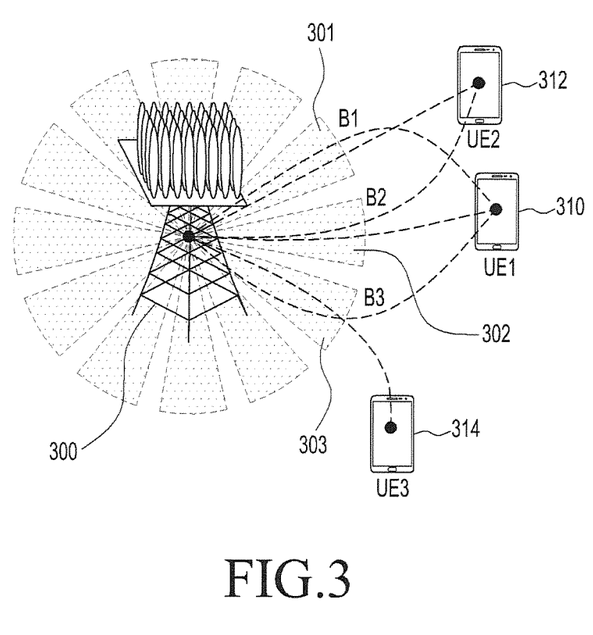
FIG. 3 illustrates a structure in which UEs have different numbers of reception beam links according to an embodiment of the present disclosure.

FIG. 3 illustrates a structure in which UEs have different numbers of reception beam links.

UE#1 310, UE#2 312, and UE#3 314 have links with one or more reception beams of a BS 300. For example, UE#1 310 has links with three reception beams 301, 302, and 303 of the BS 300. UE#2 312 has links with two reception beams 301 and 302 of the BS 300. UE#3 314 has a link with one reception beam 303 of the BS 300.

Figure 4:
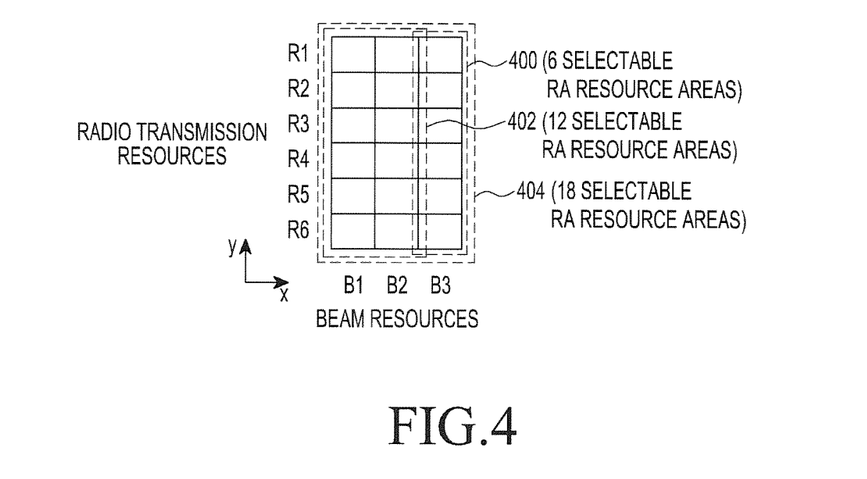
FIG. 4 illustrates RA resources in a case where the number of selectable RA resources is determined in proportion to the number of reception beam links of UEs according to an embodiment of the present disclosure.

FIG. 4 illustrates a case where the number of selectable RA resources is determined in proportion to the number of reception beam links of the UEs illustrated in FIG. 3.

Hereinafter, RA resources have a structure defined by beam resources (x axis) and radio transmission resources (y axis). The x axis of the RA resource set corresponds to an axis of reception beams of the BS, and the y axis corresponds to an axis of radio transmission resources defined by at least one of a frequency, a time, and a code. For simplification, multidimensional radio resources defined by a combination of one or more of the frequency, the time, and the code are represented on the y axis in one dimension.

In FIG. 4, each of the UEs does not separate (or limit or specify) areas of radio transmission resources (for example, frequency-time resources) to be used as RA resources according to the number of reception beam links of the UEs.

Specifically, UE#1 310 has three reception beam resource links and thus has all frequency-time resources corresponding to the three reception beams B1, B2, and B3 as selectable RA resource areas 404, and the RA resource areas 404 include a total of 18 RA resources.

UE#2 312 has two reception beam resource links and thus has all frequency-time resources corresponding to the two reception beams B1 and B2 as selectable RA resource areas 402, and the RA resource areas 402 include a total of 12 RA resources.

UE#3 314 has one reception beam resource link and thus has all frequency-time resources corresponding to the one reception beam B3 as selectable RA resource areas 400, and the RA resource areas 400 include a total of 6 RA resources.

When the selectable RA resource areas of the UE having the small number of reception beams are small, a possibility of collision generated in random access is higher compared to another UE having the large number of reception beams. This is because the UE having the small number of reception beams may select only a subset of the selectable resources areas of the other UE having the large number of reception beams when performing RA. In terms of fairness, it is unfair to assign small selectable RA resources to the UE having the small number of reception beams. That is, determining selectable resources in proportion to the number of reception beam links of UE causes an unfair RA success possibility between UEs.

Accordingly, the present disclosure proposes a method of assigning the same number of selectable RA resources to UEs regardless of the number of reception beams but differently setting selectable resource areas according to the number of reception beams.

Figure 5:
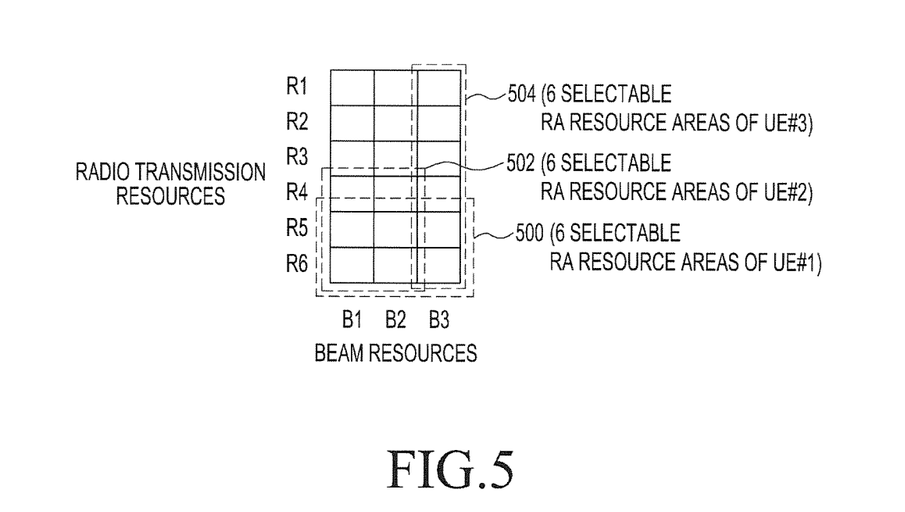
FIG. 5 illustrates RA resources in a case where the number of selectable RA resources is equally determined regardless of the number of reception beam links of UEs according to an embodiment of the present disclosure.

FIG. 5 illustrates an example of a case where the number of selectable RA resources is equally determined regardless of the number of reception beam links of UEs illustrated in FIG. 3.

The UE may select random access resources based on the number of links that the UE determined by itself, so that all UEs having the same priority may use the same number of RA resources for random access. That is the present disclosure proposes a method by which each of the UEs separates (or limits or specifies) areas of radio transmission resources (for example, frequency-time resources) to be used as RA resources based on the number of reception beam links of the UEs.

As illustrated in FIG. 3, UE#1 700, UE#2 702, and UE#3 704 may select different selectable frequency-time resources in a state where UE#1 700, UE#2 702, and UE#3 704 have three reception beam links, two reception beam links, and one reception beam link, respectively. For example, each UE may be configured to select frequency-time resource areas that are inversely proportional to the number of reception beam links.

Specifically, UE#1 310 that can use all three reception beams B1, B2, and B3 is configured to randomly select two resources R5 and R6 among frequency-time resources R1 to R6 as RA resources, and then has six (=3*2) selectable resources as the RA resources. Although FIG. 5 illustrates that UE#1 310 can select resources R5 and R6, the present disclosure is not limited thereto and other frequency-time resources can be selected.

UE#2 312 that can use two reception beam resources B1 and B2 is configured to randomly select three resources R4 to R6 among the frequency-time resources R1 to R6 as RA resources, and then has six (=2*3) resources as the RA resources. Although FIG. 5 illustrates that UE#2 312 can select resources R4 to R6, the present disclosure is not limited thereto and other frequency-time resources can be selected.

UE#3 314 that can use only one reception beam resource B3 is configured to select all six frequency-time resources R1 to R6 as RA resources, and then has six (=6*1) resources as the RA resources.

Accordingly, each of UE#1 310, UE#2 312, and UE#3 314 may be configured to equally select six resource areas regardless of the number of reception beam links. As described above, through the configuration of selectable RA resources, UEs having different numbers of available reception beam links can have the same number of RA resources and UEs having the same priority can have the fair RA success possibility.

Selectively, the UE may grasp the priority thereof as well as the number or reception beam links and may use the priority for determining RA resources. In the present disclosure, the priority of the UE is referred to as a rank. The rank may be defined as a type of data to be transmitted through uplink, mobility of the UE (for example, in a case where a call change is rapidly made), or a factor (or environment) requiring quick synchronization acquisition. The rank may be divided into various steps. A UE having a higher rank value may be considered as a UE having a higher priority and a UE having a lower rank value may be considered as a UE having a lower priority.

Figure 6A:
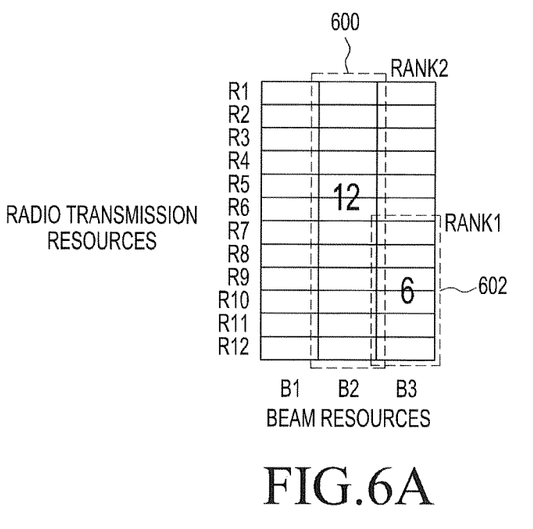
FIG. 6A, FIG. 6B and FIG. 6C illustrate a process in which the UE configures random access resource areas based on a rank according to an embodiment of the present disclosure.
Figure 6B:
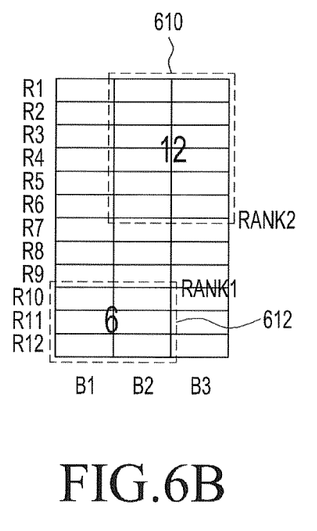
Figure 6C:
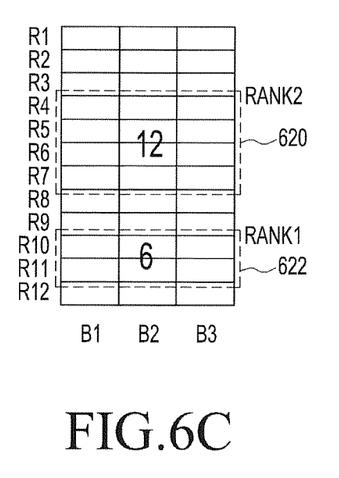

FIG. 6A, FIG. 6B and FIG. 6C illustrate a process in which the UE configures random access resource areas based on the rank according to the present disclosure.

When UEs have the same rank value, the number of resources that can be selected by each UE is configured to be the same regardless of the number of reception beams.

When UEs have different rank values, the random access priority of the UE becomes higher as the rank value is higher. Accordingly, random access resource areas that can be selected by the UE having the high rank value become wider. When the random access resource areas become wider, a random access success possibility becomes higher. Therefore, the UE having the higher rank value may have a higher random access success possibility compared to the UE having the lower rank value.

FIG. 6A, FIG. 6B and FIG. 6C illustrate configurations of RA resources by two UEs having different rank values as an example.

FIG. 6A illustrates a case where the number of reception beam links of the UEs is 1. A UE having a rank of 2 has a higher priority than a UE having a rank of 1, and the UE having the rank of 2 may be configured to use more RA resources than the UE having the rank of 1 in order to guarantee a high RA success rate of the UE having the rank of 2. For example, the UE having the rank of 2 may be configured to use 12 RA resource areas 600 in beam resources B2, and the UE having the rank of 1 may be configured to use 6 RA resource areas 602 corresponding to some radio transmission resources (for example, frequency-time resources) in beam resources B3.

FIG. 6B illustrates a case where the number of reception beam links of the UEs is 2. The UE having the rank of 2 has a higher priority than the UE having the rank of 1, and the UE having the rank of 2 may be configured to use more RA resources than the UE having the rank of 1 in order to guarantee a high RA success rate of the UE having the rank of 2. For example, the UE having the rank of 2 may be configured to use 12 RA resource areas 610 corresponding to some radio transmission resources (for example, frequency-time resources) in beam resources B2 and B3, and the UE having the rank of 1 may be configured to use 6 RA resource areas 612 corresponding to some radio transmission resources (for example, frequency-time resources) in beam resources B1 and B2.

FIG. 6C illustrates a case where the number of reception beam links of the UEs is 3. The UE having the rank of 2 has a higher priority than the UE having the rank of 1, and the UE having the rank of 2 may be configured to use more RA resources than the UE having the rank of 1 in order to guarantee a high RA success rate of the UE having the rank of 2. For example, the UE having the rank of 2 may be configured to use 12 RA resource areas 620 in some radio transmission resources (for example, frequency-time resources) in beam resources B1, B2, and B3, and the UE having the rank of 1 may be configured to use 6 RA resource areas 622 corresponding to some radio transmission resources (for example, frequency-time resources) in beam resources B1, B2, and B3.

Preferably, some frequency-time resources may be allocated as frequency-time resources that are not used by another UE.

Although FIG. 6A, FIG. 6B and FIG. 6C illustrate the case where the number of rank values is 2, the present disclosure can be applied to a case where the UEs have three or more different rank values based on the same principle.

The third step of the random access scheme according to the present disclosure is described with reference to FIG. 7.

The BS and the UE may use the number (s) of links, of which links are guaranteed when RA is performed, for an RA response. If RA is successful without collision in s or more links among L links when the UE performs the RA through the L reception beam links connected to the BS, the UE may be configured to receive a response to RA success from the BS. For example, when the BS makes a request for forming two or more reception beam links to the UE due to a service characteristic, an increase of s may guarantee the forming of a plurality of reception beam links.

At this time, s may correspond to a value larger than or equal to 1 and may be defined as s=[L/d]. A value of d may be set to be equal to or smaller than L. When the value of d is equal to L, s is 1. When the value of d is L/2, s is 2. As described above, by controlling the value of d, a predetermined number (that is, s) or more of link connections can be guaranteed, and thus the UE can acquire an uplink connection with the BS. The UE may use s in a beam uplink cooperation procedure or a beam uplink negotiation procedure. Further, the value of d may be determined according to a rank of the UE or a service type (or QoS) to be transmitted by the UE through the uplink.

Figure 7:
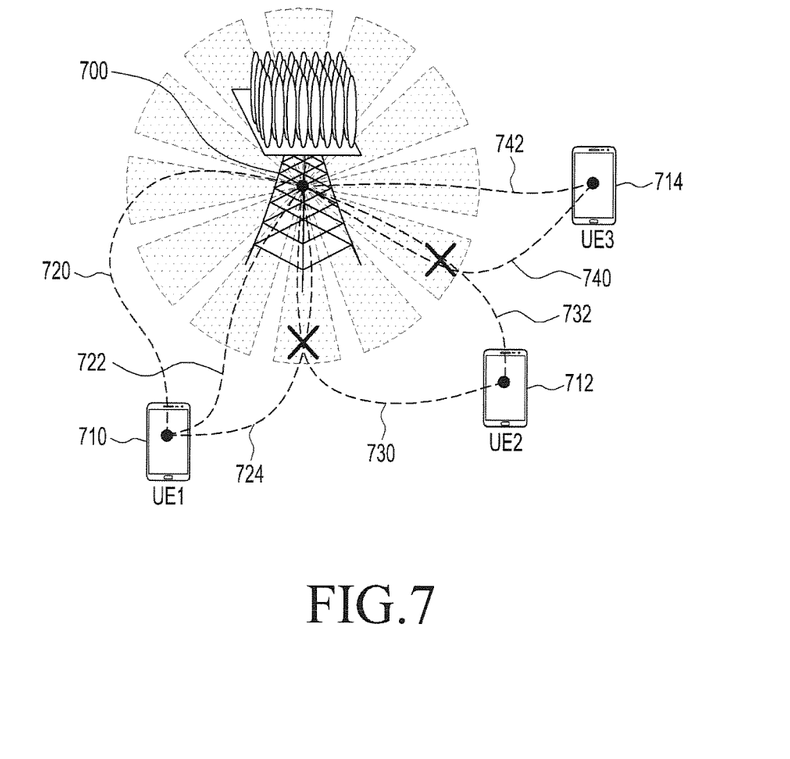
FIG. 7 illustrates UEs performing random access and whether the random access is successful or not according to an embodiment of the present disclosure.

FIG. 7 illustrates UEs performing random access and whether the random access is successful or not according to the present disclosure.

A BS 700 forms reception beam links with three UEs 710, 712, and 714. UE#1 710 has three reception beam links 720, 722, and 724 with the BS 700, UE#2 712 has two reception beam links 730 and 732 with the BS 700, and UE#3 714 has two reception beam links 740 and 742 with the BS 700. UE#1 710 and UE#3 714 successfully perform RA in the two reception beam links 720 and 722 and the one reception beam link 742 without collision, respectively, and UE#2 712 fails in the RA due to the generation of collision in all the reception beam links 730 and 732.

When values of s for all UEs are 1, UE#1 710 and UE#3 714 receive a response corresponding to RA success from the BS, and UE#2 712 fails in the RA. When values of s for all UEs are 2, only UE#1 710 succeeds in the RA, and UE#2 712 and UE#3 714 fail in the RA. The UE having failed in the RA may receive a response corresponding to the RA failure or may receive no response.

Figure 8:
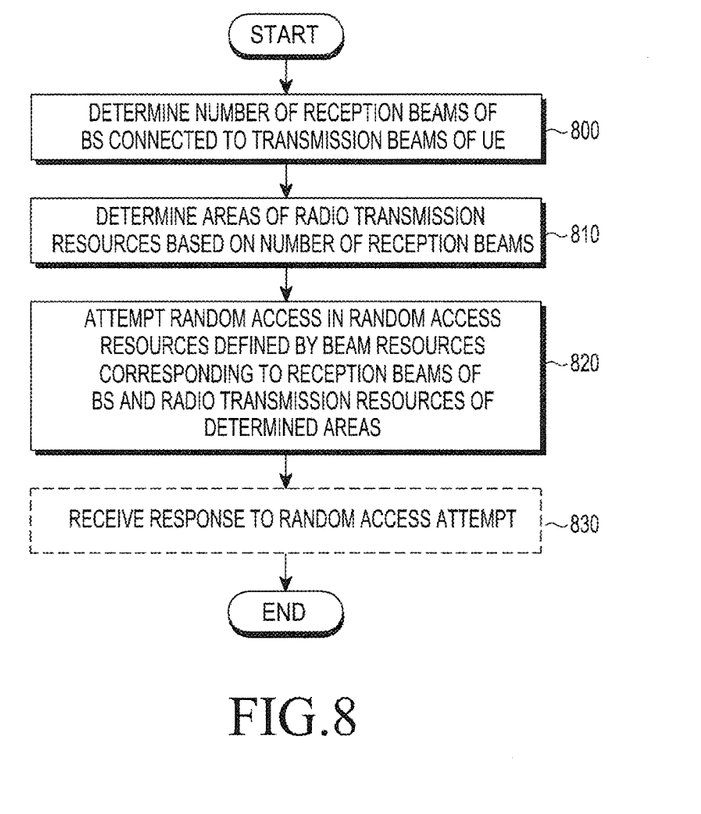
FIG. 8 illustrates a random access method of the UE according to an embodiment of the present disclosure.

FIG. 8 illustrates a random access method of the UE according to the present disclosure.

Not all the operations described below need to be described to achieve an aspect of the present disclosure. In an implementation of the method according to the present disclosure, it should be noted that each operation is selectively included.

The UE may determine the number of reception beams of the BS connected to transmission beams of the UE in step 800. For example, the UE may perform an operation for estimating a channel for at least one reception beams of the BS, identify reception beams having a channel estimation result larger than or equal to a threshold value, and determine the identified number of reception beams as the number of reception beams. In another example, the UE may perform an operation for receiving a neighbor advertisement, identify reception beams identified by information included in the neighbor advertisement, and determine the number of identified reception beams as the number of reception beams.

The UE may determine areas of radio transmission resources (for example, frequency-time resources) based on the number of reception beams in step 810. The UE may determine areas of radio transmission resources such that RA resource areas having the same size as that of another UE are determined regardless of the number of reception beams (if priorities are the same). For example, the UE may determine the areas of the radio transmission resources in inverse proportion to the number or reception beams. Selectively, when determining the areas of the radio transmission resources, the UE may further consider the priority of the UE as well as the number of reception beams. At this time, the UE may determine the areas of the radio transmission resources corresponding to (proportional to) a value of the priority of the UE.

The UE may attempt random access in random access resources defined by beam resources corresponding to the reception beams of the BS and the radio transmission resources of the determined areas in step 820.

Selectively, the UE may receive a response to the attempt of the random access from the BS in step 830. The received response may indicate success of the random access only when the number of reception beams, of which the attempt is successful, is larger than or equal to a predetermined number (s) among the connected reception beams of the BS. When links to a plurality of reception beams are required, the predetermined number may have a value larger than or equal to 2.

Here, the radio transmission resources may be resources defined by one of a frequency, a time, and a code.

Figure 9:
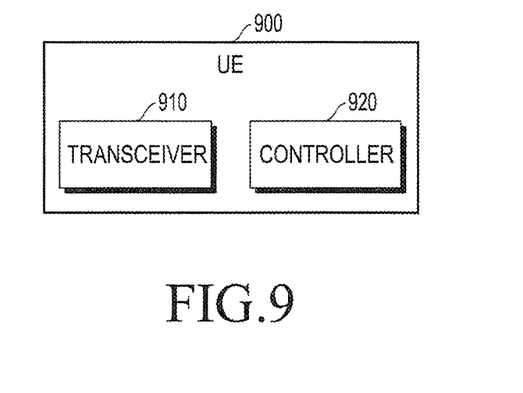
FIG. 9 schematically illustrates a configuration of a UE apparatus according to an embodiment of the present disclosure.

FIG. 9 schematically illustrates a configuration of a UE apparatus according to the present disclosure.

A UE apparatus 900 may include a transceiver 910 for transmitting and receiving signals or data to and from a BS, and a controller 920 for performing the operation of the UE described in the present disclosure by controlling the transceiver 910.

It may be understood that all the operations of the UE described in the present disclosure are performed by a control of the controller 920. The controller 920 and the transceiver 910 are not necessarily implemented as separate devices but may be implemented as one element (in the form such as a single chip).

Figure 10:
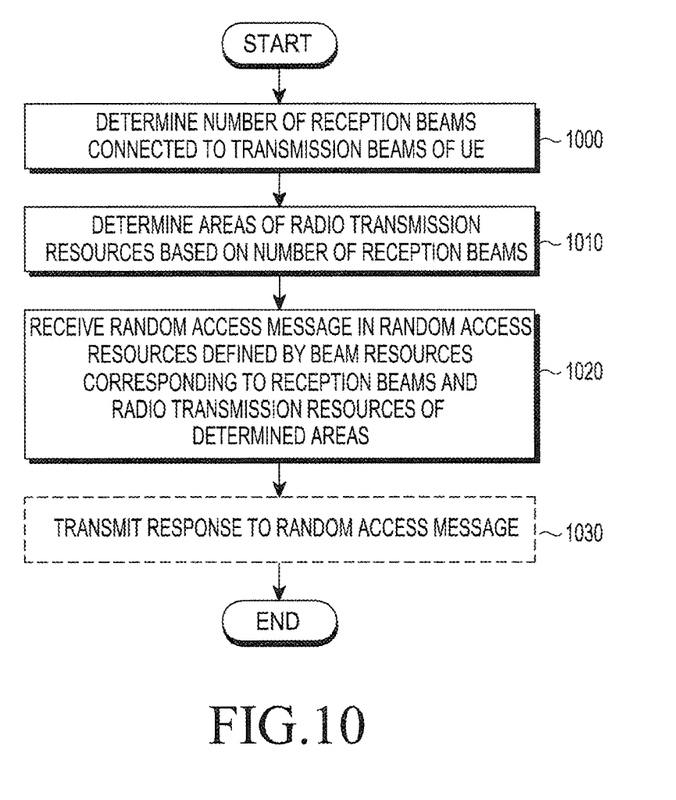
FIG. 10 illustrates a method of supporting random access by a BS according to an embodiment of the present disclosure.

FIG. 10 illustrates a method of supporting random access by a BS according to present disclosure.

Not all the operations described below need to be described to achieve an aspect of the present disclosure. In an implementation of the method according to the present disclosure, it should be noted that each operation is selectively included.

The BS may determine the number of reception beams connected to transmission beams of the UE in step 1000. For example, the BS may receive a report on a channel estimation result for the one or more reception beams from the UE, identify reception beams having a channel estimation result larger than a threshold value, and determine the number of identified reception beams as the number of reception beams. In another example, the UE may determine the number of reception beams by itself and transmit reception beams corresponding to the determined number to the UE through a neighbor advertisement.

The BS may determine areas of radio transmission resources (for example, frequency-time resources) based on the number of reception beams in step 1010. Alternatively, the BS may determine the area of the radio transmission resources of the UE such that RA resources having the same size as that of another UE are determined regardless of the number of reception beams (if priorities are the same). For example, the BS may specify the areas of the radio transmission resources in inverse proportion to the number of the reception beams. Alternatively, when determining the areas of the radio transmission resources, the BS may further consider the priority of the UE as well as the number of reception beams. At this time, the BS may determine the areas of the radio transmission resources to have the size corresponding to (proportional to) a value of the priority of the UE. Selectively, in order to indicate random access resources allocated to the UE, the BS may transmit a message including information on the determined areas of the radio transmission resources and reception beams to the UE.

The BS may receive a random access message in random access resources defined by beam resources corresponding to the reception beams and the radio transmission resources of the determined areas in step 1020.

Selectively, the BS may transmit a response to the random access message to the UE in step 1030. The transmitted response may indicate success of the random access only when the number of reception beams, of which the random access (message) is successful, is larger than or equal to a predetermined number(s) among the reception beams. When links to a plurality of reception beams are required, the predetermined number may have a value larger than or equal to 2.

Here, the radio transmission resources may be resources defined by one of a frequency, a time, and a code.

Figure 11:
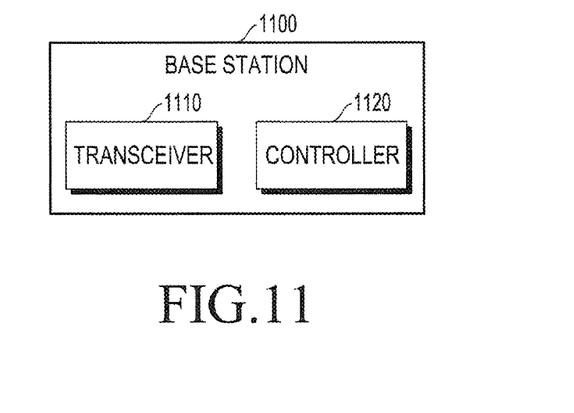
FIG. 11 schematically illustrates a configuration of a BS apparatus according to an embodiment of the present disclosure.

FIG. 11 schematically illustrates a configuration of a BS apparatus according to the present disclosure.

A BS apparatus 1100 may include a transceiver 1110 for transmitting and receiving signals or data to and from a UE, and a controller 1120 for performing the operation of the BS described in the present disclosure by controlling the transceiver 1110.

It may be understood that all the operations of the BS described in the present disclosure are performed by a control of the controller 1120. The controller 1120 and the transceiver 1110 are not necessarily implemented as separate devices but may be implemented as one element (in the form such as a single chip).

It should be noted that the diagrams of the system, the RA resource configuration, the UE access method, the BS access supporting method, the UE apparatus configuration, and the BS apparatus configuration illustrated in FIGS. 2 to 11 are not intended to limit the scope of the present disclosure. That is, it should not be construed that all component parts or operations shown in FIGS. 2 to 1 are essential component elements for implementing the present disclosure, and it should be understood that only a few component elements may implement the present disclosure within a scope without departing the subject matter of the present disclosure.

The above described operations may be implemented by providing a memory device storing a corresponding program code to the entity of the communication system, the function, the base station, the load manager, or a specific structural element of the terminal. That is, the entity, the function, the load manager, or the controller of the terminal carries out the above described operations by reading and executing the program code stored in the memory device by means of a processor or a CPU.

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of performing random access of a user equipment (UE), the method comprising:
    determining a number of reception beams of a base station (BS) connected to transmission beams of the UE;
    determining radio transmission resources used for a random access for each of the reception beams; and
    attempting the random access in the determined radio transmission resources through the reception beams,
    wherein a number of the radio transmission resources used for the random access for each of the reception beams is determined by dividing a total number of random access resources of the UE by the number of the reception beams.

2. The method of claim 1, wherein determining the number of reception beams of the BS connected to the transmission beams of the UE comprises:
    estimating a channel for at least one reception beam of the BS; and
    determining the number of reception beams of the BS connected to the transmission beams of the UE, the number of reception beams having a result of the channel estimation larger than or equal to a threshold value.

3. The method of claim 1, wherein determining the number of reception beams of the BS connected to the transmission beams of the UE comprises:
receiving, from the BS, a neighbor advertisement; and
determining the number of reception beams of the BS connected to the transmission beams of the UE, the number of reception beams identified by information included in the neighbor advertisement.

4. The method of claim 1, wherein random access resources of a second UE having a priority equal to that of the UE and the random access resources of the UE have an equal size, and
wherein the second UE is connected to the BS.

5. The method of claim 1, wherein the total number of random access resources of the UE is determined based on a priority of the UE.

6. The method of claim 1, further comprising receiving a message indicating a success of the random access in response to the attempt of the random access, when the number of reception beams, of which performance of the random access is successful, is larger than or equal to a predetermined number.

7. The method of claim 6, wherein, when links with the BS through at least two reception beams are needed, the predetermined number is larger than or equal to 2.

8. The method of claim 1, wherein the radio transmission resources correspond to resources defined by at least one of a frequency, a time, or a code.

9. A user equipment (UE) for performing random access, the UE comprising:
a controller configured to:
determine a number of reception beams of a base station (BS) connected to transmission beams of the UE, and
determine radio transmission resources used for a random access for each of the reception beams; and
a transceiver configured to attempt the random access in the determined radio transmission resources through the reception beams,
wherein a number of the radio transmission resources used for the random access for each of the reception beams is determined by dividing a total number of random access resources of the UE by the number of the reception beams.

10. The UE of claim 9, wherein the controller is configured to:
estimate a channel for at least one reception beam of the BS; and
determine the number of reception beams of the BS connected to the transmission beams of the UE, the number of reception beams having a result of the channel estimation larger than or equal to a threshold value.

11. The UE of claim 9, wherein the controller is configured to:
receive, from the BS, a neighbor advertisement; and
determine the number of reception beams of the BS connected to the transmission beams of the UE, the number of reception beams identified by information included in the neighbor advertisement.

12. The UE of claim 9, wherein random access resources of a second UE having a priority equal to that of the UE and the random access resources of the UE have an equal size, and
wherein the second UE is connected to the BS.

13. The UE of claim 9, wherein the total number of random access resources of the UE is determined based on a priority of the UE.

14. The UE of claim 9, wherein the controller is configured to receive a message indicating a success of the random access in response to the attempt of the random access, when the number of reception beams, of which performance of the random access is successful, is larger than or equal to a predetermined number.

15. The UE of claim 14, wherein, when links with the BS through at least two reception beams are needed, the predetermined number is larger than or equal to 2.

16. The UE of claim 9, wherein the radio transmission resources correspond to resources defined by at least one of a frequency, a time, or a code.

17. A method of supporting random access by a base station (BS), the method comprising:
determining a number of reception beams of the BS connected to transmission beams of a user equipment (UE);
determining radio transmission resources used for a random access for each of the reception beams; and
receiving a random access message in the determined radio transmission resources through reception beams,
wherein a number of the radio transmission resources used for the random access for each of the reception beams is determined by dividing a total number of random access resources of the UE by the number of the reception beams.

18. A base station (BS) supporting random access of a user equipment (UE), the BS comprising:
a controller configured to:
determine a number of reception beams connected to transmission beams of the UE, and
determine radio transmission resources used for a random access for each of the reception beams; and
a transceiver configured to receive a random access message in the determined radio transmission resources through reception beams,
wherein a number of the radio transmission resources used for the random access for each of the reception beams is determined by dividing a total number of random access resources of the UE by the number of the reception beams.

* * * * *